(12) United States Patent
Sun et al.

(10) Patent No.: US 7,650,615 B2
(45) Date of Patent: Jan. 19, 2010

(54) APPARATUS AND METHOD FOR DESTROYING DATA STORAGE MEDIA

(76) Inventors: Ying-Shih Sun, 17303 Carranza Dr., San Diego, CA (US) 92127; Wade Sun, 3466 Bathgate La., San Jose, CA (US) 95121

( * ) Notice: Subject to any disclaimer, the term of this patent is extended or adjusted under 35 U.S.C. 154(b) by 292 days.

(21) Appl. No.: 10/951,952

(22) Filed: Sep. 28, 2004

(65) Prior Publication Data

US 2006/0070094 A1    Mar. 30, 2006

(51) Int. Cl.
*G11B 23/03*    (2006.01)
(52) U.S. Cl. ..................................... 720/718
(58) Field of Classification Search ............... 720/718
See application file for complete search history.

(56) References Cited

U.S. PATENT DOCUMENTS

| 4,816,385 | A | | 3/1989 | Gravesteijn |
| 5,520,865 | A | * | 5/1996 | Sargent et al. .............. 264/106 |
| 5,832,804 | A | * | 11/1998 | Dudley et al. ................. 83/870 |
| 6,039,637 | A | * | 3/2000 | Hutchison et al. ........... 451/271 |
| 6,189,446 | B1 | * | 2/2001 | Olliges et al. .................. 101/6 |
| 6,469,963 | B1 | | 10/2002 | Sawada |
| 6,676,050 | B2 | | 1/2004 | Chang |
| 6,679,444 | B2 | * | 1/2004 | Castronovo .............. 241/101.2 |
| 6,709,802 | B2 | | 3/2004 | Lawandy |
| 6,722,240 | B1 | * | 4/2004 | Weng .......................... 83/167 |
| 6,799,737 | B1 | | 10/2004 | Bargert |
| 7,249,724 | B2 | * | 7/2007 | Rotelli ........................ 241/169 |
| 7,374,114 | B1 | * | 5/2008 | Pekay et al. ................. 241/169 |
| 2003/0231418 | A1 | * | 12/2003 | Katsuda ....................... 360/55 |

FOREIGN PATENT DOCUMENTS

| JP | 09293348 | * | 11/1997 |
| JP | 2004039059 | * | 2/2004 |
| JP | 2004171638 | * | 6/2004 |
| JP | 2004326895 | * | 11/2004 |

OTHER PUBLICATIONS

Urbach, Cool Thing of the Month, The Besser 100Dx CD Destroyer, Sep. 2003 online review, www.urbachletter.com/Archive/CTOM_0309_CDDestroyer.htm.
Disc Dealer™, The Disc Peeler™, San Diego, CA. online ad, www.discdealer.com/disc-peeler.html.

* cited by examiner

*Primary Examiner*—Angel A. Castro
(74) *Attorney, Agent, or Firm*—West and Associates, A PC; Stuart J. West; Sara Dirvianskis (57) ABSTRACT

A method and apparatus for permanently rendering data recorded on an optical disc unreadable, comprising a slotted alignment plate and a scarifying component. A disc rests against the plate so that the slot traverses the disc. The scarifying component slides through the slot and contacts the disc surface, thus creating an optically disruptive groove across a surface layer of the optical disc. This disruptive groove can pass through the index and data region and prevents access to previous data and information stored on the disc.

17 Claims, 6 Drawing Sheets

APPARATUS AND METHOD FOR DESTROYING DATA STORAGE MEDIA

BACKGROUND

1. Field of the Invention

The present invention is related to a method and apparatus for permanently erasing data stored on an optical disc, such as a CD or a DVD.

2. Description of the Related Art

Optical discs include discs such as the CD (Compact Disc) and the DVD (Digital Versatile Disc). These exist in commercial, R (Recordable), and RW (Rewritable)-types. In general, data is stored on an optically reflective foil layer, which is physically supported by a rigid transparent layer, through which a laser beam reads and writes data. The market for CD and DVD recorders and drives has exploded with the growing demand to store digital pictures, video, music, and other data. Optical storage, in turn, creates the need for the capability to erase and/or destroy unwanted or confidential information.

For RW-type discs, erasure may be accomplished by using a recorder or computer drive to re-write over the old information, as disclosed in U.S. Pat. No. 4,816,385 entitled "METHOD OF OPTICALLY RECORDING AND ERASING INFORMATION" to Gravesteijn issued on Mar. 28, 1989; U.S. Pat. No. 6,469,963 entitled "OPTICAL RECORDING MEDIUM AND METHOD OF INFORMATION RECORDING/READING AN OPTICAL RECORDING MEDIUM" to Sawada issued on Oct. 22, 2002; and U.S. Pat. No. 6,709,802 entitled "METHODS AND APPARATUS FOR RENDERING AN OPTICALLY ENCODED MEDIUM UNREADABLE" to Lawandy issued on Mar. 23, 2004. These methods and apparatus involve changing the optical properties of the reflective layer of an RW-type disc, which occurs during a play or record process. Therefore, these methods and apparatus require a computer drive or other recording device in order to erase the contents of the disc.

Furthermore, it may be possible, with the use of sophisticated data recovery and reconstruction methods, to recover data that has been erased on RW-type discs.

For commercial as well as R-type discs, once data is recorded or burned onto the disc, it cannot be erased during a read or write process because of the optically unchangeable foil layer. Sensitive and confidential information, once recorded onto these discs, cannot be simply deleted.

As a result, a need exists for a method and/or apparatus to securely erase commercial, R-type, and RW-type discs that require special handling because they were used to record highly sensitive information.

Once an optical disc becomes useless, the user may break the disc to dispose of it, but the resulting sharp fragments of the broken disc may harm the hands. A compact disc shredder may be used, as described in U.S. Pat. No. 6,676,050 entitled "PAPER SHREDDER HAVING THE FUNCTION OF BREAKING A COMPACT DISC" to Chang issued on Jan. 13, 2004. Such machines, however, are costly and require electric power to operate. Furthermore, their operation generates a great amount of noise in destroying the CDs, and creates waste materials that may require additional disposal measures.

Other existing machines and apparatus demonstrate further shortcomings. The Bosser CD Destroyer (Patent Pending) is a motor-driven machine that dents both surfaces of the optical disc to prevent data retrieval. A dented disc, however, may damage the player if there is an attempt to play the dented disc. In addition, the dents may be smoothed out with commercially available polishing devices and polishes, which can render the disc readable again. Furthermore, this apparatus may not be able to dent through discs with labels applied to them.

Another existing device is the manually operated Disc Peeler™, by Disc Dealer™ (San Diego, Calif.), which features sharp teeth that grind off the reflective foil layer from the compact disc. However, discs that have applied labels would make operation of this device more difficult. Furthermore, this device can generate a great deal of metallic dust, which can be difficult to clean and may be harmful to the user. Obviously, inserting such a frayed disc with metal dust into a playing device could result in damage to the playing device.

Therefore, it is desired to provide a method and device for erasing an optical disc that is inexpensive and simple to operate. It is desirable to have a small, portable device that accomplishes this in a relatively effortless manner without the need for electrical power, and without creating excessive waste material. Finally, the resulting disc should neither pose any harm to the user, nor damage a playing device if there is an attempt to play it.

BRIEF DESCRIPTION OF THE DRAWINGS

FIG. 1a is a cross-sectional view of the plate, taken generally along line 1a—1a of FIG. 1;

DETAILED DESCRIPTION

Figure 1:
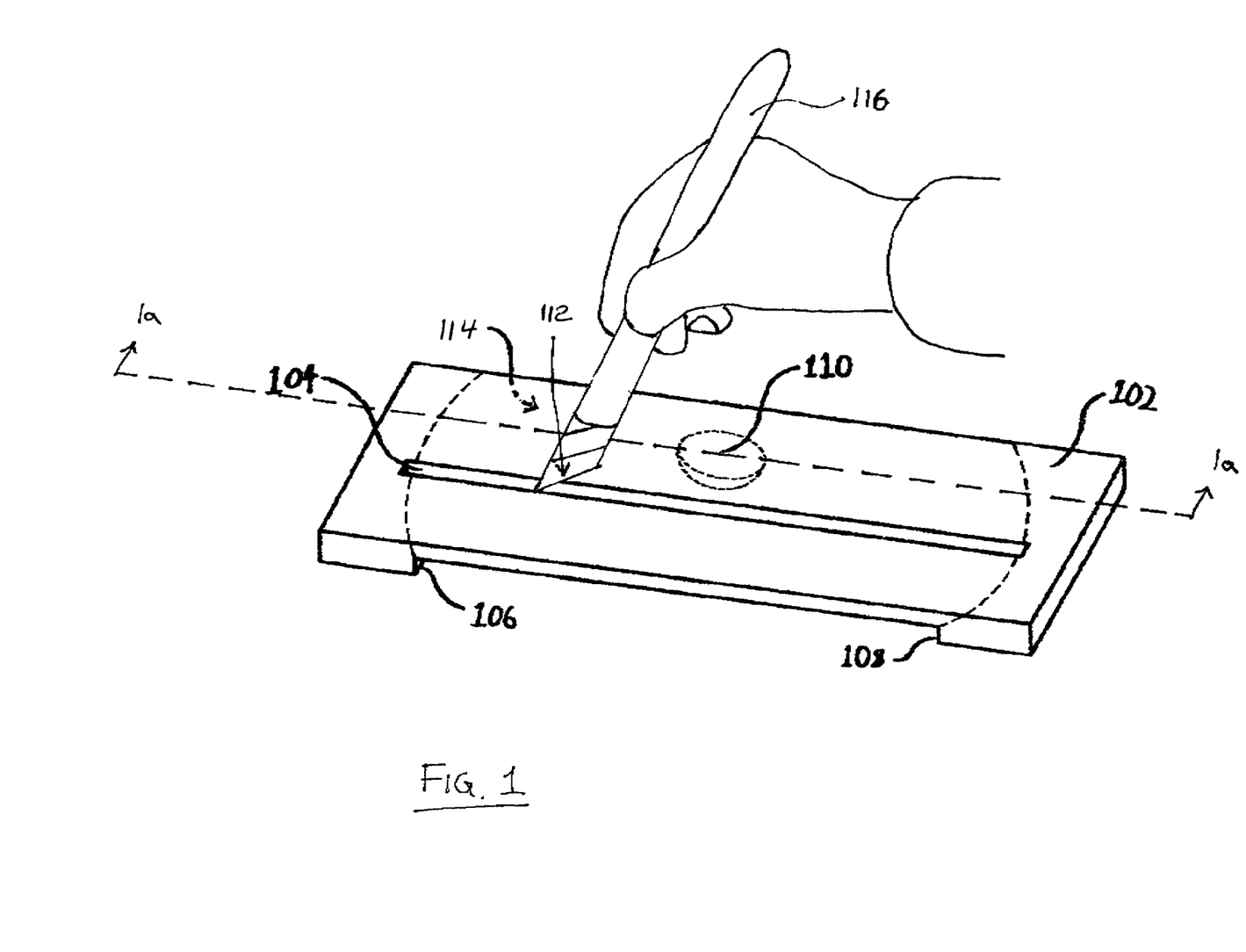
FIG. 1 is a perspective view of the plate of the apparatus.

FIGS. 1 and 1a show one embodiment of the apparatus. Plate 102 is shown with a slot 104 within that extends parallel to the length of plate 102 and is of length slightly less than that of plate 102. Slot 104 is located substantially centrally with respect to the major and minor axes of plate 102 and extends through the thickness of plate 102. Raised surfaces 106, 108, and 110, either singly or in any combination, properly align the optical disc in relation to slot 104. In particular, raised surface 110 can be circular and fit into the central spindle hole of optical discs. However, in alternate embodiments the raised surface 110 can have any convenient shape. Additionally, in alternate embodiments, the raised surface 110 can be configured to removeably fasten a disc to the plate 102. An optical disc placed into the plate is able to rotate on an axis centered on raised surface 110. Plate 102 guides a scarifying component 112 through slot 104 such that it contacts the surface of an optical disc that is placed against disc resting surface 114 on the bottom side of plate 102. The scarifying component 112 can be attached to a hand-held holder 116 in any known or convenient way.

In alternate embodiments, the slot 104 can be geometrically oriented in any convenient way relative to the plate 102 and can have any convenient shape or geometric pattern.

Figure 2:
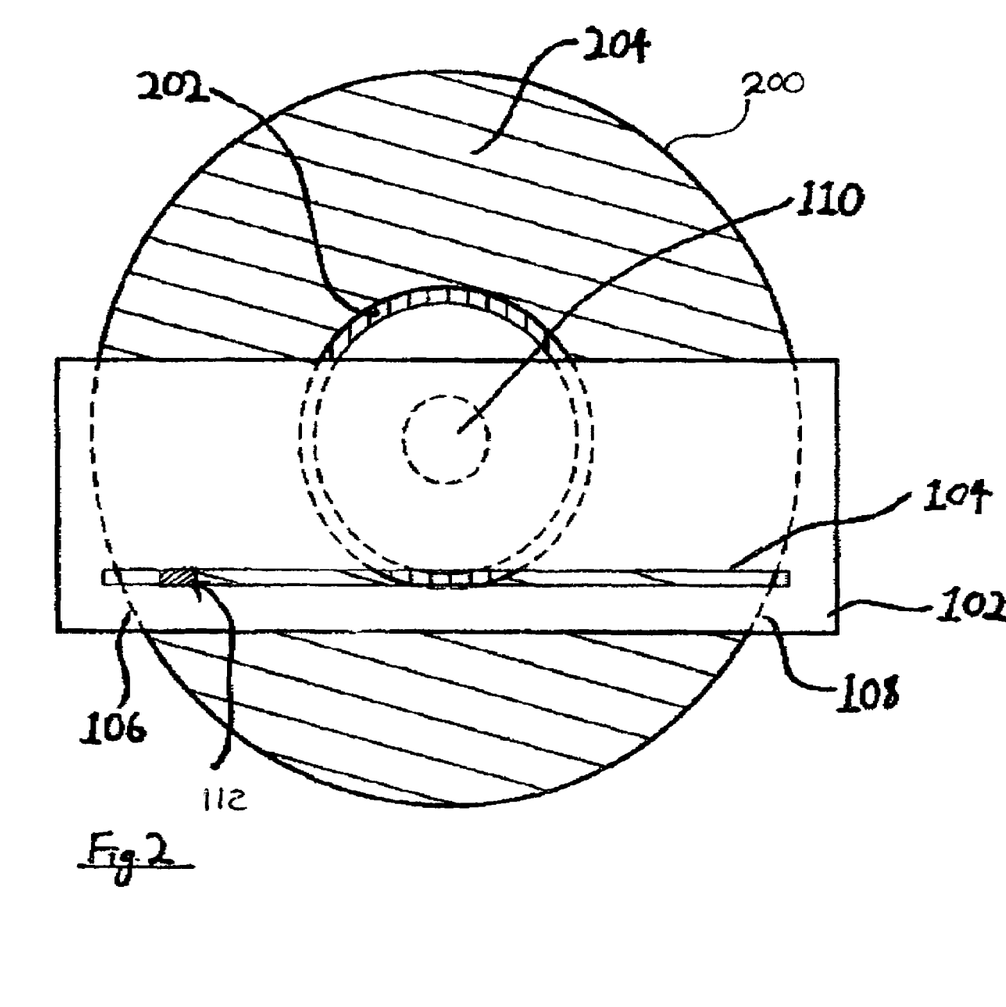
FIG. 2 is a top plan view of the plate with an optical compact disc placed underneath.

FIG. 2 shows the apparatus with an optical disc 200 placed against the resting surface 114. The raised surfaces 106, 108, and 110 hold the disc in place such that the slot 104 covers an area on the disc surface traversing index track 202 of the optical disc and the data region 204. As the translatable scarifying component 112 travels along slot 104, it creates an optically disruptive groove on the surface of the disc through the index track 202 and the data region 204. Although the slot 104 is depicted as substantially linear, in alternate embodiments the slot 104 can have any convenient geometric shape or curvature.

Figure 3:
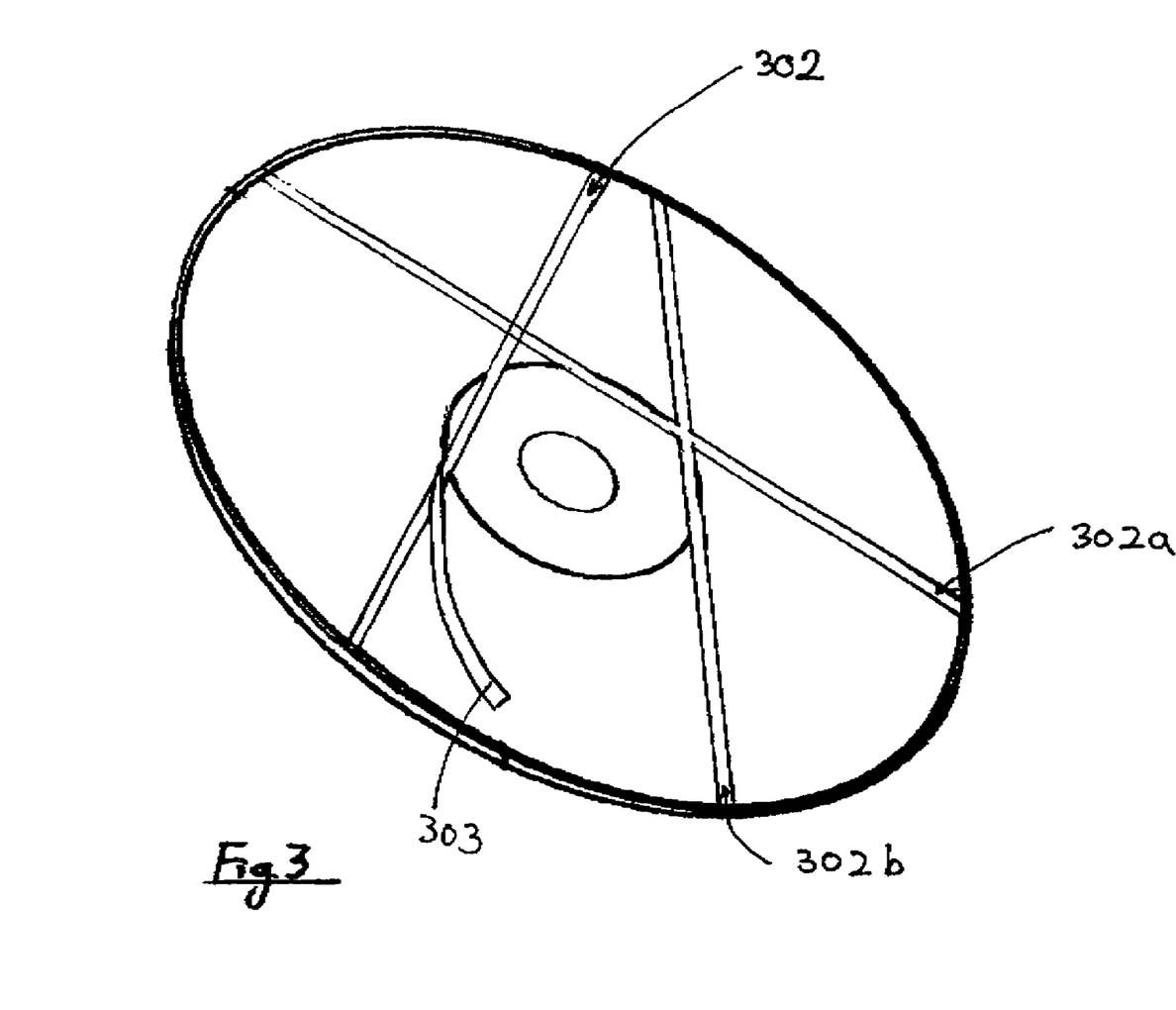
FIG. 3 shows an optical disc with optically disruptive grooves cut from its surface.

FIG. 3 illustrates how the blade creates an optically disruptive groove 302 on the surface of the disc. A thin strip of material 303 may be excised from the disc during the scarifying process. A plurality of these optically disruptive grooves 302a, 302b can be created by rotating the optical disc, and then translating the scarifying component 112 within the slot 104.

Figure 4:
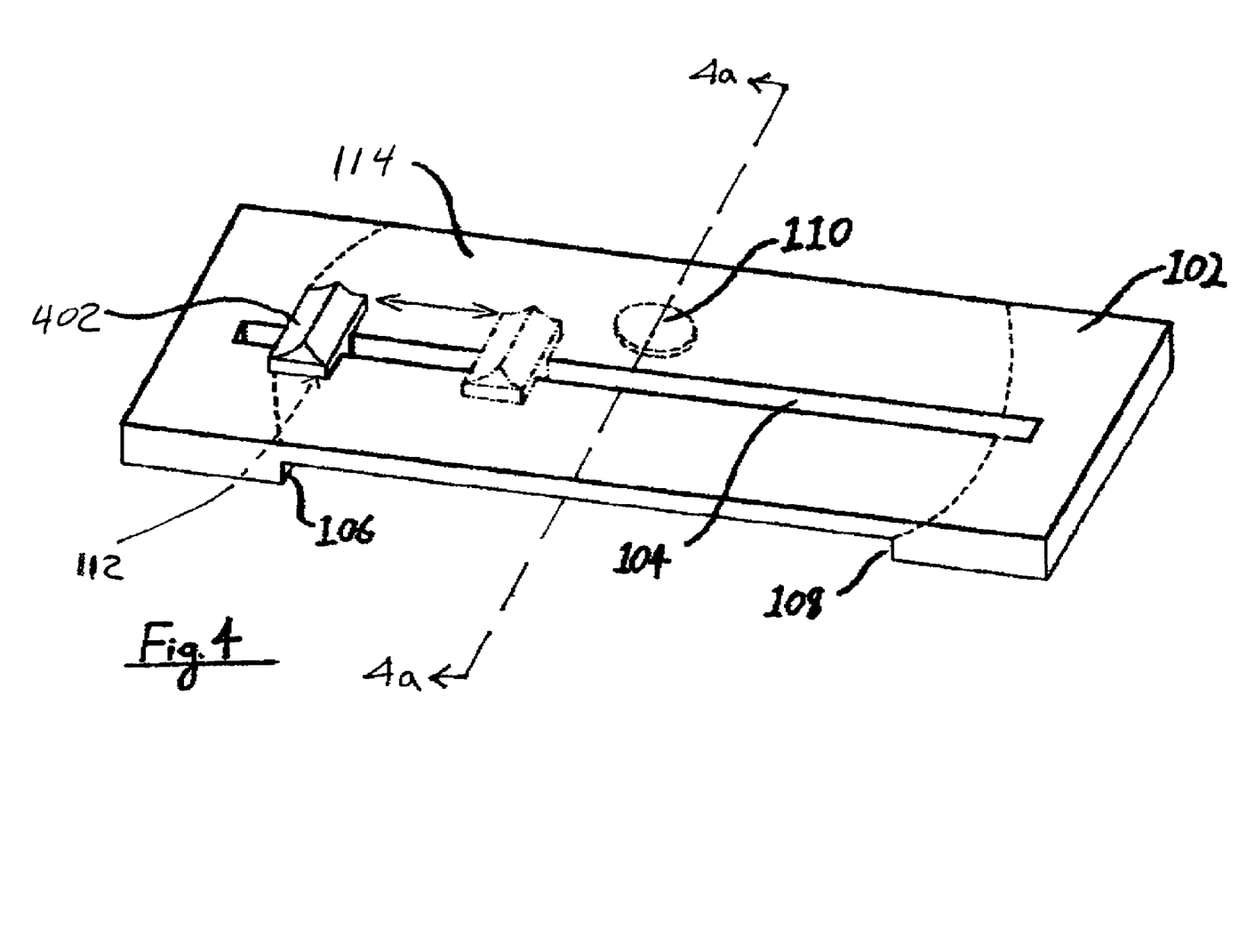
FIG. 4 is a perspective view showing an embodiment of the apparatus.
Figure 4A:
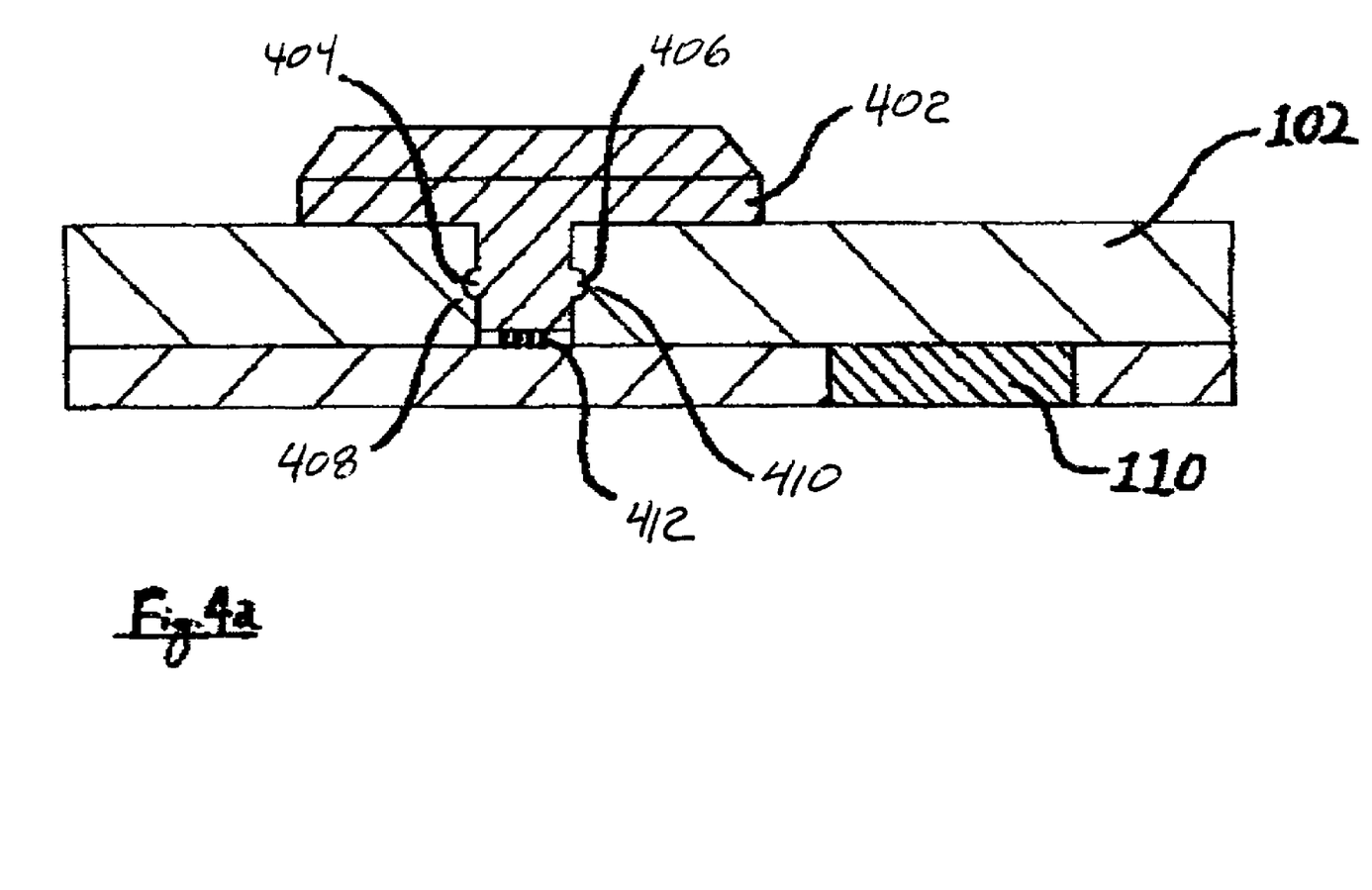
FIG. 4a is a cross-sectional view taken generally along line 4a—4a of FIG. 4.

FIGS. 4 and 4a show another embodiment of the apparatus. Referring to FIG. 4, scarifying component 112 is attached to a holder 402, which rectilinearly slides along slot 104. FIG. 4a shows rails 404 and 406, protruding from the holder 402 and grooves 408 and 410 to slidably connect the holder to slot 104. Grooves 408 and 410 are substantially tangentially parallel to the slot 104 and located substantially centrally with respect to the depth of slot 104. In alternate embodiments, a slidable connection may also be made in any other known or convenient manner.

In the embodiment depicted in FIGS. 4 and 4a, the scarifying component 112 is a set of double-edged blades 412 which allow cutting during both directions of translation along the slot 104. Blades 412 can be replaced with any other known or convenient blade designs, abrasive materials or other convenient or known scarifying component. In alternate embodiments, scarifying component 112 can be retractably attached to the holder 402 in any known or convenient manner.

Figure 5:
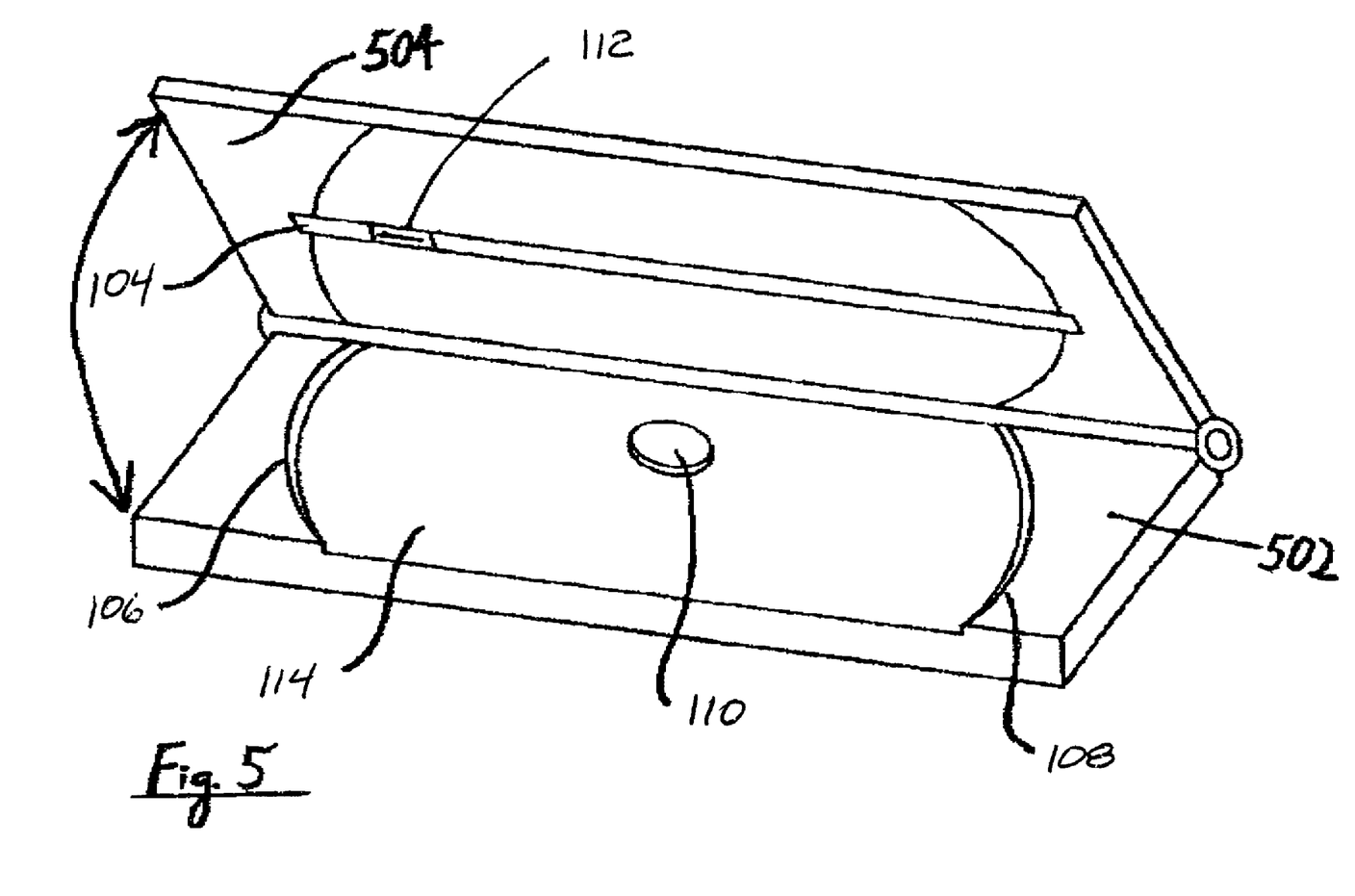
FIG. 5 is a perspective view of another embodiment of the present invention, featuring a hinged base plate.

FIG. 5 depicts another embodiment of the apparatus in which plate 502 and plate 504 form a hinged apparatus. Plate 504 is shown with a slot 104 that extends parallel to the length of plate 504. In the embodiment shown if FIG. 5, the slot 104 has a length slightly less than that of plate 504. However in alternate embodiments, the slot 104 can extend to one end of the plate 504. In the embodiment shown in FIG. 5, slot 104 is located substantially centrally with respect to the major and minor axes of plate 504 and extends through the thickness of plate 504. However in alternate embodiments, the slot 104 can have any convenient shape and/or can be located in any convenient location on the plate 504.

Plate 502 includes raised surfaces 106, 108, and 110, which, either singly or in any combination, can properly align the optical disc relative to the slot 104. Plate 504 guides a scarifying component 112 through slot 104 such that it contacts the surface of an optical disc that is placed against disc resting surface 114 of plate 502.

The plates, raised surfaces and scarifying component holder can be comprised of any known or convenient material, including, but is not limited to, plastic, metal, wood, ceramic or any other material known or convenient.

The scarifying component 112 can be any component capable of scaring the optical data storage surface of the disc, including, but not limited to, metal, ceramic, plastic, or any other known and convenient material; abrasive material; chemical agent; thermal and/or optical device.

OPERATION

In the embodiment shown in FIG. 1, an optical disc containing data that is to be destroyed is placed with either the foil layer surface (for R-type discs), or the transparent plastic surface (for R-type discs or DVDs) against resting surface 114. Raised surfaces 106, 108, and 110, either singly or in any convenient combination, can align the disc with slot 104. The disc and plate 102 can be placed disc-side down on a table or other surface. The scarifying component 112 can then be translated through slot 104, creating an optically disruptive groove on the disc surface. In alternate embodiment, one or more of the raised surfaces or alternate engagement mechanisms can engage the disc such that the apparatus may be used without placing it on a table or other surface.

Although one optically disruptive groove can render a disc unreadable, the disc can be rotated relate to the slot in the resting area and the scarification process can be repeated to create additional optically disruptive grooves on the disc for added security.

During or after the scarifying process, a stripped foil section 303 can detach from the surface of the optical disc. If the adhesion between the foil layer and the disc is slight, strip 303 may be peeled or wiped away by hand and disposed of. If the adhesion is strong, stripped foil section 303 may remain on the disc. Whether the strip 303 is disposed of or remains on the disc, the disc would still be rendered unreadable.

Different sizes and shapes of optical discs may also be erased in this manner by using a raised surface to align the disc by its center hole and then translating the scarifying component 112 along slot 104 to create an optically disruptive groove across the disc surface.

The resulting optically disruptive groove provides a visual indication that the disc has been rendered unreadable. Further, this can help prevent such a disc from being played in a playing device.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. An apparatus for rendering data recorded on an optical disc unreadable, comprising:
   a plate having a bottom surface;
   said bottom surface delineating a disc resting area;
   said plate having a lengthwise slot therethrough that defines a cutting region,
   comprising less than the surface area of one side of an optical disk;
   a scarifying component that is longitudinally translatable within said slot.

2. The apparatus of claim 1, wherein said scarifying component is a blade.

3. The apparatus of claim 2, wherein said blade is comprised of multiple edges.

4. The apparatus of claim 1, wherein said scarifying component is an abrasive.

5. The apparatus of claim 1, wherein said scarifying component is a thermal device.

6. The apparatus of claim 1, wherein said scarifying component utilizes a chemical agent.

7. The apparatus of claim 1, wherein said scarifying component is an optical device.

8. The apparatus of claim 1, wherein said scarifying component is attached to a holder such that a portion of said scarifying component extends through said plate within said slot.

9. The apparatus of claim 8, wherein said holder includes a mechanism which allows said scarifying component to slide longitudinally within said slot, said mechanism being associated with said plate.

10. The apparatus of claim 8, wherein said holder is associated with said slot such that said scarifying component can be extended and retracted relative to said bottom surface of said plate.

11. The apparatus of claim 8, wherein said scarifying component is retractably associated with the holder.

12. The apparatus of claim 1, wherein said scarifying component is a handheld tool.

13. A disc disruption kit comprising:
   a plate having a raised surface and a lengthwise slot that defines a cutting region, comprising less than the surface of one side of an optical disk;
   wherein said raised surface is capable of aligning a disc relative to said slot such that at least a segment of said slot is substantially aligned with at least a portion of an index area of said disc;
   a scarifying component that is longitudinally translatable within said slot.

14. The disc data disruption kit of claim 13 wherein said scarifying component is comprised of at least one of a blade, an abrasive, a thermal device, a chemical device and an optical device.

15. The disc data disruption kit of claim 13 wherein said scarifying component is detachably associated with said plate such that said scarifying component can be longitudinally translated within said slot.

16. A method for rendering an optical device unreadable, comprising the steps of:
   positioning a disc relative to a plate having a lengthwise slot that defines a cutting region, comprising less than the surface area of one side of an optical disk; and
   longitudinally translating a scarifying component through said slot, thereby scaring an optical surface of said disc.

17. The method of claim 16 wherein said step of positioning comprises the steps of:
   aligning said slot such that at least a segment of said slot is aligned with at least a portion of an index area of said disc.

* * * * *

UNITED STATES PATENT AND TRADEMARK OFFICE
CERTIFICATE OF CORRECTION

PATENT NO.       : 7,650,615 B2                                    Page 1 of 1
APPLICATION NO.  : 10/951952
DATED            : January 19, 2010
INVENTOR(S)      : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Twenty-third Day of November, 2010

David J. Kappos
*Director of the United States Patent and Trademark Office*